United States Patent [19]

Usmani et al.

[11] Patent Number: 5,451,621
[45] Date of Patent: Sep. 19, 1995

[54] SBS-MODIFIED, ASPHALT-BASED MATERIAL WITH RESISTANCE TO CROSSLINKING

[75] Inventors: Arthur M. Usmani, Indianapolis; William B. Gorman, Mooresville; Gary S. Thompson, Indianapolis; Edward G. Kane, Carmel, all of Ind.

[73] Assignee: Bridgestone/Firestone, Inc., Akron, Ohio

[21] Appl. No.: 290,052

[22] Filed: Aug. 15, 1994

[51] Int. Cl.⁶ ............................................... C08L 95/00
[52] U.S. Cl. ....................................... 524/68; 524/70; 524/71
[58] Field of Search ............................. 524/68, 70, 71

[56] References Cited

U.S. PATENT DOCUMENTS

| | | | |
|---|---|---|---|
| H1,250 | 11/1993 | Gilmore et al. | 524/68 |
| 3,978,014 | 8/1976 | van Beem et al. | 524/68 |
| 4,148,780 | 4/1979 | Blümel et al. | 260/42.46 |
| 4,273,685 | 6/1981 | Marzocchi et al. | 260/28.5 R |
| 4,282,127 | 8/1981 | Desgouilles | 524/68 |
| 4,316,829 | 2/1982 | Roberts | 260/28.5 AS |
| 4,444,947 | 4/1984 | Harrington et al. | 525/545 |
| 4,600,635 | 7/1986 | Wiercinski et al. | 524/68 |
| 4,659,381 | 4/1987 | Walters | 106/18.16 |
| 4,659,389 | 4/1987 | Wombles et al. | 106/279 |
| 4,732,925 | 3/1988 | Davis | 524/426 |
| 4,749,622 | 6/1988 | Vonk et al. | 528/489 |
| 4,804,696 | 2/1989 | Jolitz et al. | 524/68 |
| 4,891,272 | 1/1990 | Ciaccia | 428/489 |
| 4,973,615 | 11/1990 | Futamura et al. | 524/68 |
| 5,026,747 | 6/1991 | Jolitz et al. | 524/64 |
| 5,055,135 | 10/1991 | Grube et al. | 106/281.1 |
| 5,100,715 | 3/1992 | Zimmerman et al. | 428/147 |
| 5,102,463 | 4/1992 | Jolitz et al. | 106/273.1 |
| 5,110,674 | 5/1992 | Grube et al. | 428/283 |
| 5,126,384 | 6/1992 | Davis et al. | 524/71 |
| 5,130,355 | 7/1992 | Hergenrother et al. | 524/71 |
| 5,328,943 | 7/1994 | Isobe et al. | 524/70 |

FOREIGN PATENT DOCUMENTS 0345402 12/1989 European Pat. Off. .......... 524/68
0085855 5/1982 Japan ................................ 524/68

OTHER PUBLICATIONS

"Modified Bitumens Containing Thermoplastic Polymers" by Piazza et al., *Rubber Chemistry and Technology*, vol. 53, pp. 994–1005, (Mar. 1980).

"The Role of Bitumen in Blends with Thermoplastic Rubbers for Roofing Applications" by Gooswilligen et al., International Waterproofing Association conference, pp. 46–52, (1986).

"Firebrake® ZB Zinc Borate–The Unique Multifunctional Additive" by Kelvin K. Shen, *Plastics Compounding*, Sep./Oct. 1985 (12 pages).

"Zinc Borate as a Flame Retardant, Smoke Suppressant, and Afterglow Suppresant", by Shen, from Fire Retardant Chemical Association, pp. 1–28, Mar. 1984.

"Will toxicity concerns doom workhorse flame-retardant systems?" by Wood, *Modern Plastics*, pp. 40–44, May 1990.

*Primary Examiner*—Peter A. Szekely
*Attorney, Agent, or Firm*—Frank J. Troy, Sr.

[57] ABSTRACT

An asphalt material, useful for forming a membrane, comprises a mixture of from about 47 to about 74 parts by weight of asphalt, from about 7 to about 15 parts by weight of styrene-butadiene-styrene block copolymer, from about 15 to about 25 parts by weight of a filler component, and from about 1 to about 5 parts by weight of polypropylene homopolymer. A method for preparing a modified-asphalt material comprises the steps of forming a mixture by admixing from about 47 to about 74 parts by weight of asphalt; from about 7 to about 15 parts by weight of a styrene-butadiene-styrene block copolymer; from about 15 to about 25 parts by weight of a filler; and from about 1 to about 5 parts by weight of a polypropylene homopolymer; wherein the polypropylene homopolymer inhibits high temperature crosslinking of the styrene-butadiene-styrene block copolymer.

24 Claims, No Drawings

SBS-MODIFIED, ASPHALT-BASED MATERIAL WITH RESISTANCE TO CROSSLINKING

TECHNICAL FIELD

The present invention relates to a modified asphalt-based material suitable for preparing a membrane sheeting useful for roofing purposes. Particularly, this invention relates to asphalt roofing material which is elastomeric and flexible with improved stiffness and hardness, and which has improved high temperature stability and long term resistance to environmental conditions.

BACKGROUND OF THE INVENTION

Asphalt roof sheeting is typically used as a single ply roofing membrane for industrial and commercial flat roofs. These membranes are usually processed into sheeting rolls and applied to roofs in long strips. Ordinarily, these sheets are joined to each other and to the substrate by heating, usually with a torch, so as to create a continuous roofing surface.

Asphalt roof sheeting is typically used as a single ply roofing membrane for industrial and commercial flat roofs. These membranes are usually processed into sheeting rolls and applied to roofs in long strips. Installation of these membranes requires adjoining the strips together to form a continuous roofing surface. These membranes are typically adjoined by using some form of adhesive or, more desirably, by heating.

Elasticity and flexibility facilitate processing, installation and most importantly overall use of the asphalt membrane. It is well known in the art to add synthetic or natural polymeric material to the asphalt-based membrane, thereby achieving elasticity and flexibility. Typically, vinyl containing polymers are added to accomplish such results.

Although the addition of vinyl containing polymers results in the desired flexibility and elasticity, their addition has at the same time limited the methods which can be used to adjoin the seams. Ideally, the seams are torched or heated which slightly melts the membranes allowing them to flow together. The vinyl containing polymers, however, will crosslink in the presence of high heat, thus inhibiting the ability of the membranes to flow together. Further, crosslinking causes the viscosity of the membrane to increase, decreasing the melt flow of the membrane which adds further obstacle to adjoining the membranes. As a result, other methods of adhesion are employed to adjoin the seams of vinyl containing membranes, a typical example being the use of a bonding adhesive.

It is believed that heat and ultra violet (UV) radiation promote crosslinking of the vinyl containing polymers. Thus, in addition to presenting problems during installation, crosslinking of the vinyl polymers creates problems throughout the life of the membrane since roofing surfaces are exposed to heat and UV light from the sun's rays. This long term crosslinking coupled with the crosslinking experienced during installation serves to shorten the life of the roofing membrane.

Finally, the addition of vinyl polymers, which are typically uncured, presents further installation problems in that the membranes are often unworkable. Thus, while a flexible and elastomeric roofing compound is desired, those membranes containing uncured polymers are often too soft and lack a workable stiffness and hardness.

SUMMARY OF INVENTION

It is therefore a primary object of the present invention to provide an asphalt material having improved high temperature resistance and long term stability to the sun's heat and UV radiation.

It is another object of the present invention to provide an asphalt material with elasticity and flexibility having improved hardness and stiffness.

It is a further object of the present invention to provide an asphalt material which is elastomeric and flexible without sacrificing the ability of the asphalt material to withstand high temperatures and UV light.

At least one or more of the foregoing objects of the present invention together with the advantages thereof over existing asphalt materials, which shall become apparent from the specification which follows, are accomplished by the invention as hereinafter described and claimed.

In general, the present invention provides an asphalt material, useful for forming a membrane, comprising a mixture of from about 47 to about 74 parts by weight of asphalt, from about 7 to about 15 parts by weight of styrene-butadiene-styrene block copolymer, from about 15 to about 25 parts by weight of a filler component, and from about 1 to about 5 parts by weight of polypropylene homopolymer.

The present invention also provides a method for preparing a modified asphalt material comprising the steps of forming a mixture by admixing from about 47 to about 74 parts by weight of asphalt; from about 7 to about 15 parts by weight of a styrene-butadiene-styrene block copolymer; from about 15 to about 25 parts by weight of a filler; and from about 1 to about 5 parts by weight of a polypropylene homopolymer; wherein the polypropylene homopolymer inhibits high temperature crosslinking of the styrene-butadiene-styrene block copolymer.

PREFERRED EMBODIMENT FOR CARRYING OUT THE INVENTION

The present invention is directed toward a modified asphalt-based material. The asphalt material is elastomeric and flexible as a result of the addition of a vinyl containing block copolymer. A homopolymer is further added to the asphalt material to abate any crosslinking which may occur between the vinyl containing block copolymers.

We believe that the crosslinking of the vinyl block copolymers is inhibited due to polypropylene polymers randomly attaching along the vinyl block copolymer chain.

Because polypropylene is known to degrade over time, especially under conditions found on a roofing surface, we also believe polypropylene will provide long term protection against crosslinking of the styrene-butadiene-styrene (SBS) block copolymer, as the fragmented pieces of polypropylene will continually attach to the vinyl block copolymer chain.

Modified asphalt material is typically processed into a membrane sheet. The asphalt material of the present invention, which is useful for forming such a membrane, preferably includes a mixture of from about 47 to about 74 parts by weight of asphalt, from about 7 to about 15 parts by weight of styrene-butadiene-styrene (SBS) block copolymer, from about 15 to about 25 parts by weight of a filler component, and from about 1 to about 5 parts by weight of polypropylene homopolymer.

An example of an asphalt useful in the present invention is that produced by Ashland under the trade name AC-5. Such asphalts typically contain about 40 to about 52 parts by weight of aromatic hydrocarbons, about 20 to about 44 parts by weight of polar organic compounds, about 10 to about 15 parts by weight of asphaltene, about 6 to about 8 parts by weight of saturates and about 4 to about 5 parts by weight of sulfur. Nevertheless, practice of the present invention is not limited by selection of a particular asphalt.

Typically, the molecular weight of the aromatic hydrocarbons present in asphalt ranges between about 300 and 2000, while the polar organic compounds, which generally include hydroxylated, carboxylated and heterocyclic compounds, have a molecular weight of about 500 to 50,000. Asphaltenes, which are generally known as heavy hydrocarbons, are of a high molecular weight and are heptane insoluble. Saturates generally include paraffinic and cycloaliphatic hydrocarbons of about 300 to 2000 molecular weight.

Generally, bitumens are naturally occurring solidified hydrocarbons, typically collected as a residue of petroleum distillation. Gilsonite is the purest naturally formed bitumen, typically having a molecular weight of about 3,000 with about 3 parts by weight complexed nitrogen. Although the preferred asphalt material of the present invention contains bitumen, it has been found that the addition of 1 to about 8 parts by weight of Gilsonite serves to improve the asphalt membrane material. Particularly, the addition of Gilsonite will increase the stiffness and hardness of the membrane while improving membrane adhesion to mats and other surfaces. Furthermore, the addition of Gilsonite serves to improve the compatibility of the asphalt material with the polymer material of the present invention.

An example of Gilsonite useful for practice of the present invention is that sold by the American Gilsonite Company under the tradename of HMA. Such Gilsonite is naturally occurring and usually found and mined in North America.

SBS block copolymers useful for practice of the present invention are generally characterized in that they have a weight average molecular weight of from about 90,000 to about 750,000 and preferably from about 150,000 to about 250,000 with a polydispersity of up to about 1.01. Preferred SBS block copolymers have from about 27 to about 43 parts by weight of styrene, although amounts outside this range are within the scope at the invention.

An example of an SBS block copolymer useful for practice of the present invention is that produced by the Shell Chemical Company under the tradename Shell 1101. This SBS block copolymer is a linear block copolymer. Also useful are radial SBS block copolymers which are also sold by the Shell Chemical Company, such as their product 1184. Enichem 161B, made by Enichem America, is also useful. Ideally, the two block copolymers, linear and radial, can be mixed to achieve the desired results. While any ratio of linear to radial SBS copolymers is useful in the practice of the inventor, it is preferred to employ from about 0 to about 7 parts by weight of radial and from about 7 to about 15 parts by weight of linear SBS block copolymer.

SBS block copolymers may be prepared by anionic polymerization reactions using butyl lithium or other catalysts. Such reactions may be terminated by conventional terminators such as water, carbon dioxide, isopropyl alcohol or the like. Alternatively, the polymerization reactions may be terminated with materials providing functional end groups on the polymer chains. Examples of such terminal end groups include mercapto, carboxyl, hydroxyl, amine and the like.

While several derivatives of polypropylene are useful, a preferred polypropylene of the present invention is synthesized by first dimerizing propylene to give 4-methyl-1-pentene and subsequently polymerizing this dimer to give poly- 4-methyl-1-pentene. Such polypropylenes have a weight average molecular weight of from about 50,000 to about 250,000, and preferably from about 150,000 to about 170,000. The polydispersity is in the 2.5 to 3.5 range. The polypropylene is further characterized in that is has a melt temperature of from about 160° C. to about 175° C., and has a high cold crystallization temperature, generally above 120° C.

Additionally, we have found that various derivatives of polypropylene can be added to achieve desired results. Particularly, the addition of isotactic polypropylene (IPP) serves to improve the melt flow and rigidity of the asphalt membrane while serving to inhibit cross-linking of the SBS block copolymer. Stiffening and hardness, which accompany the addition of crystalline polypropylenes are undesirable for flexibility at lower temperatures, but can be reduced by the addition of amorphous polypropylene (APP). Thus, desired stiffness and rigidity can be achieved by varying the ratio of crystalline polypropylene and amorphous polypropylene. Preferably, the polypropylene comprises from about 50 to about 100 parts by weight of IPP and from about 1 to about 50 parts by weight of APP.

A useful example of an IPP useful in the present invention is that produced by the Himont Company and sold under the tradename Himont 6203. An example of an APP useful in the present invention is that produced by the Eastman Chemical and sold under the tradename Eastman E 1060.

The filler component of the present invention is usually calcium carbonate. Such filler is abundant and commercially available from Piqua Materials under the tradename PMF-70. Generally, such fillers serve to lower the cost of the asphalt material. Other useful fillers include mica, clay, treated clay, precipitated calcium carbonate, talc, diatomaceous earth, mineral slag and silicas.

EXPERIMENTAL

In order to demonstrate the practice of the present invention, eleven (11) modified asphalt-based membranes were prepared and tested for viscosity, hardness, tack, low strain modulus, and melt flow. The results of these tests are reported hereinbelow. First, a control modified asphalt-based membrane, representative of roofing membranes heretofore known in the art, was produced and tested. The components of each membrane are reported in TABLE I and the test results are reported in TABLE II.

All membranes according to the present invention were made by the following method. SBS block copolymers were added to asphalt heated to 290° F. (143° C.) under high shear over a 30 minute period. Considerable heat was generated and the temperature of blending mix was allowed to reach 390° F. (199° C.). Cooling was applied to maintain the temperature around 390° F. (199° C.). Following addition of SBS block copolymer, polypropylene and/or Gilsonite was added at 390° F. (199° C.) to the reaction mass under high shear. The reaction mass was maintained at 390° F. (199° C.) under high shear for an additional 1.25 hours to achieve good dispersion. The filler was then added over a 30 minute period at about 390° F. (199° C.) under low shear mixing and the mass was mixed for an additional 1.5 hours to complete the compound preparation. A membrane was formed by pouring hot compound into a Teflon mold placed in an oven and sandwiching it between a nonwoven PET mat. The compound was then evenly distributed. The assembled mold was pressed at approximately 140° F. (60° C.), cooled, and demolded.

In Example Nos. 3, 4, 5, 8, 9 and 10 an amount of polypropylene was added to the SBS-modified asphalt composition. The viscosity of the compositions did not increase over a 16 hour period at 180° C. The Control Example and Example 1, which did not have any polypropylene, registered substantial increase in viscosity over the 16 hour period. TABLE III, provided below, shows initial viscosity and viscosity after 5 hours at 180° C. This data clearly shows that the compositions according to the present invention exhibit a reduced tendency to crosslink.

TABLE I

MEMBRANE COMPOSITIONS
COMPOSITION (parts by weight)

| Example | AC-5 | Shell 1101 | Enichem 161B | Isotactic Crystalline Polypropylene | Amorphous Polypropylene | Gilsonite HMA | Filler |
|---|---|---|---|---|---|---|---|
| CONTROL | 70.4 | 6.72 | 2.88 | 0 | 0 | 0 | 20 |
| 1 | 67.4 | 6.72 | 2.88 | 0 | 0 | 3 | 20 |
| 2 | 64.4 | 6.72 | 2.88 | 0 | 0 | 6 | 20 |
| 3 | 70.4 | 5.22 | 1.38 | 3 | 0 | 0 | 20 |
| 4 | 70.4 | 5.22 | 1.38 | 1.5 | 1.5 | 0 | 20 |
| 5 | 70.4 | 5.22 | 1.38 | 0 | 3 | 0 | 20 |
| 6 | 68.51 | 7.15 | 3.06 | 0 | 0 | 0 | 21 |
| 7 | 72.58 | 4.76 | 2.04 | 0 | 0 | 0 | 21 |
| 8 | 70.4 | 5.32 | 2.28 | 2 | 0 | 0 | 20 |
| 9 | 65.4 | 5.32 | 2.28 | 2 | 0 | 0 | 25 |
| 10 | 65.4 | 6.02 | 2.58 | 1 | 0 | 3 | 22 |

The viscosity of the molten asphalt compound was measured at 180° C. using a Brookfield viscometer, Model DV-II (Brookfield Engineering Laboratories, Inc., Stoughton, Mass. 02072).

The hardness of the asphalt membrane was tested by using a Precision Penetrometer (Precision Scientific, Chicago, Ill. 60647) at 25° C.

Tack, which is a measure of the ability of the asphalt membrane to adhere to ceramic treated granite granules, was measured by lightly pressing the membrane with the thumb. The test results were measured on a scale of 1 to 10, where 10 represented the highest degree of tack.

Low strain modulus of the asphalt membrane was tested using an Instron Model 4465 (Instron, Canton, Mass.).

Finally, melt flow, which represents the ability of the asphalt membrane to flow during torching, was tested by controlled torching while measuring the flow of the drips at a 30° slope in inches. Results are reported in TABLE II.

TABLE II

PHYSICAL PROPERTIES OF SBS-MODIFIED ASPHALT COMPOSITIONS

| Example | Initial Viscosity 180° C.(cps) | Hardness (dmm) | Tack (1-10) | Low Strain Modulus at 25% (psi) | Melt Flow (max) |
|---|---|---|---|---|---|
| CONTROL | 2560 | 30 | 5 | 12.3 | 2.1 |
| 1 | 3830 | 27 | 4 | 16.4 | 2.6 |
| 2 | 5300 | 16 | 3 | 31.9 | 1.8 |
| 3 | 2150 | 22 | 3 | 28.9 | 1.6 |
| 4 | 1870 | 24 | 6 | 22.2 | 2.6 |
| 5 | 1450 | 38 | 9 | 13.2 | 5.5 |
| 6 | 4030 | 34 | 8 | 11.8 | 2.5 |
| 7 | 1030 | 32 | 7 | 8.6 | 0.9 |
| 8 | 2620 | 27 | 2 | 36.2 | 2.2 |
| 9 | 4460 | 15 | 2 | 22.4 | 4.2 |
| 10 | 4300 | 17 | 1 | 49.4 | 3.8 |

TABLE III

VISCOSITY OF COMPOUNDS AS 180° C.
(INITIAL AND AFTER 5 HOURS)

| Example | Initial cps | After 5 hour cps |
|---|---|---|
| CONTROL | 2560 | 5000 |
| 3 | 2150 | 2160 |
| 5 | 1450 | 1490 |
| 6 | 4030 | 4900 |

Another series of asphalt membrane sheets were produced with a 180 gram polyester mat and a polyfilm backing. Seventy percent of the total asphalt content was heated to 350° F. (177° C.) with low agitation. The SBS block copolymer was added along with the remaining 30 percent of the asphalt and mixed with high agitation for 5 minutes. The mixture was then circulated through a Siefer and mixed with high agitation for 60 minutes, the batch temperature reaching 395° F. (202° C.). IPP and Gilsonite were then added and the mixture was agitated for 90 minutes. The filler was then added and the mixture was circulated through the Siefer for 45 to 60 minutes, the temperature reaching 390° F. (199° C.).

The mixture was then formed into a sheet produced with a 180 gram polyester mat and a polyfilm backing on a production line.

The components of each membrane are reported in TABLE IV and the test results are reported in TABLE V.

TABLE IV

MEMBRANE COMPOSITIONS

TABLE IV-continued

| | COMPOSITION (parts by weight) | | | | | |
|---|---|---|---|---|---|---|
| Example | AC-5 | Shell 1101 | Enichem 161B | Isotactic Crystalline Polypropylene | Gilsonite HMA | Filler |
| 11 | 65.40 | 6.02 | 2.58 | 1.0 | 3.00 | 22.00 |
| 12 | 64.74 | 5.96 | 2.55 | 2.0 | 2.97 | 21.78 |

TABLE V

PHYSICAL PROPERTIES OF SBS-MODIFIED ASPHALT COMPOSITIONS

| TESTS | EXAMPLES | |
|---|---|---|
| | 11 | 12 |
| Avg. roll weight | 99.5 | 100.6 |
| Avg. roll width | 101.1 | 101.1 |
| Avg. roll length | 10.1 | 10.2 |
| Avg. thickness | 108 | 112 |
| Granule loss | 1.9 | 1.5 |
| High temperature stability, °F. | 250 | 250 |
| Avg. tensile strength at 75° F. (24° C.) | | |
| $MD^a$ peak load | 86.4 | 97.3 |
| MD percent elongation | 65.7 | 71.0 |
| MD ULT elongation | 73.3 | 76.7 |
| $CD^b$ peak load | 60.0 | 60.5 |
| CD percent elongation | 67.9 | 67.1 |
| CD ULT elongation | 73.3 | 83.3 |
| Viscosity (cps) | 3800 | 3625 |
| Softening Pt. (°F.) | 260 | 267 |

$^a$MD = machine direction
$^b$CD = cross-machine direction

In conclusion, it should be clear from the foregoing example and specification disclosure that the modified asphalt-based membranes of the present invention exhibit improved heat resistance. It should also be clear that such results demonstrate the likelihood that such membranes will withstand the sun's heat and UV radiation for extended periods of time.

It should be understood that the addition of bitumens, such as Gilsonite, are not required to achieve the results of the present invention. Moreover, it should be understood that styrene-butadiene-styrene need not be the block copolymer of choice and that any block copolymer can be added which achieves the desired flexibility and elasticity of the membrane. Also, those skilled in the art may readily select other homopolymers and hydrocarbon polymers to serve as crosslinking inhibitors and membrane stiffeners.

What is claimed is:

1. An asphalt material, useful for forming a membrane, comprising the reaction product of:
   from about 47 to about 74 parts by weight of asphalt;
   from about 7 to about 15 parts by weight of styrene-butadiene-styrene block copolymer;
   from about 15 to about 25 parts by weight of a filler component; and
   from about 1 to about 5 parts by weight of polypropylene homopolymer;
   wherein said polypropylene homopolymer randomly attaches along the chain of said block copolymer.

2. An asphalt material, as set forth in claim 1, wherein said mixture further includes from about 1 to about 8 parts by weight of a natural bitumen component.

3. An asphalt material, as set forth in claim 1, wherein said styrene-butadiene-styrene block copolymer includes from about 0 to about 7 parts of weight of radial styrene-butadiene-styrene block copolymer and from about 7 to about 15 parts by weight of linear styrene-butadiene-styrene block copolymer.

4. An asphalt material, as set forth in claim 1, wherein said styrene-butadiene-styrene block copolymer comprises from about 27 parts 43 parts by weight of styrene.

5. An asphalt material, as set forth in claim 1, wherein said styrene-butadiene-styrene block copolymer contains a functional end-group selected from the group consisting of carboxyl, hydroxyl, amino and mercapto groups.

6. An asphalt material, as set forth in claim 1, wherein said styrene-butadiene-styrene block copolymer has a weight average molecular weight of from about 90,000 to about 750,000.

7. An asphalt material, as set forth in claim 1, wherein said styrene-butadiene-styrene block copolymer has a polydispersity of up to about 1.01.

8. An asphalt material, as set forth in claim 1, wherein said polypropylene has a weight average molecular weight of from about 50,000 to about 250,000.

9. An asphalt material, as set forth in claim 1, wherein said polypropylene polymer has a polydispersity in the range 2.5 to 3.5.

10. An asphalt material, as set forth in claim 1, wherein said polypropylene is crystalline.

11. An asphalt material, as set forth in claim 1, wherein said polypropylene has a melt temperature of from about 160° C. to about 175° C.

12. An asphalt material, as set forth in claim 1, wherein said polypropylene has a high cold crystallization temperature above about 120° C.

13. An asphalt material, as set forth in claim 1, wherein said polypropylene is selected from the group consisting of isotactic polypropylene, amorphous polypropylene and mixtures thereof.

14. An asphalt material, as set forth in claim 13, wherein said polypropylene comprises from about 50 to about 100 parts by weight of said isotactic polypropylene and from about 0 to about 50 parts by weight of said amorphous polypropylene.

15. An asphalt material, as set forth in claim 13, wherein said polypropylene is synthesized by first dimerizing propylene to give 4-methyl-1-pentene which upon polymerization gives poly 4-methyl-1-pentene.

16. An asphalt material, as set forth in claim 1, wherein said filler component is selected from the group consisting of natural calcium carbonate, precipitated calcium carbonate, talc, mica, clays, treated clays, diatomaceous earth, mineral slag and silicas.

17. An improved asphalt material including a mixture of an asphalt, a styrene-butadiene-styrene block copolymer and a filler, the asphalt having improved high temperature stability, wherein the improvement comprises:
   reacting with the mixture an amount of polypropylene homopolymer sufficient to inhibit high temperature crosslinking of the styrene-butadiene-styrene block copolymer, such that said polypropylene homopolymer randomly attaches along the chain of said block copolymer.

18. A method of preparing a modified-asphalt material comprising:
   forming a reaction product by admixing and reacting:

from about 47 to about 74 parts by weight of asphalt;

from about 7 to about 15 parts by weight of a styrene-butadiene-styrene block copolymer;

from about 15 to about 25 parts by weight of a filler; and from about 1 to about 5 parts by weight of a polypropylene homopolymer;

wherein said polypropylene homopolymer inhibits high temperature crosslinking of said styrene-butadiene-styrene block copolymer by said polypropylene homopolymer randomly attaching along the chain of said block copolymer.

19. A method, as set forth in claim 18, wherein said polypropylene homopolymer is selected from the group consisting of isotactic polypropylene, amorphous polypropylene and mixtures thereof.

20. A method, as set forth in claims 18, wherein said polypropylene is crystalline.

21. A method, as set forth in claim 18, wherein said polypropylene has a melt temperature of from about 160° C. to about 175° C.

22. A method, as set forth in claim 18, wherein said polypropylene homopolymer has a high cold crystallization temperature above about 120° C.

23. A method as set forth in claim 18, further comprising the step of adjusting the stiffness and melt flow of the modified asphalt material by varying the ratio of isotactic polypropylene to amorphous polypropylene.

24. A method as set forth in claim 18, further comprising the step of admixing from about 1 to about 8 parts by weight of a natural bitumen, wherein said bitumen contains about 3 percent by weight bound nitrogen.

* * * * *

UNITED STATES PATENT AND TRADEMARK OFFICE
CERTIFICATE OF CORRECTION

PATENT NO. : 5,451,621
DATED : September 19, 1995
INVENTOR(S) : Arthur M. Usmani, et al.

It is certified that error appears in the above-indentified patent and that said Letters Patent is hereby corrected as shown below:

Column 8, line 11 "from about 27 parts 43 parts by weight" should read --from about 27 parts by weight to about 43 parts by weight--

Signed and Sealed this

Twentieth Day of February, 1996

Attest:

BRUCE LEHMAN

*Attesting Officer*      *Commissioner of Patents and Trademarks*